United States Patent

[11] 3,617,865

[72] Inventor Goroku Hakata
6-17-4, Matsubara, Setagaya-ku, Tokyo-to, Japan
[21] Appl. No. 826,898
[22] Filed May 22, 1969
[45] Patented Nov. 2, 1971
[32] Priority May 25, 1968
[33] Japan
[31] 43/35328

[54] METHOD AND APPARATUS FOR LOCATING A BURIED METALLIC LINE EMPLOYING MAGNETIC FIELD GRADIENT MEASUREMENTS
7 Claims, 10 Drawing Figs.

[52] U.S. Cl............................................. 324/3, 324/67, 324/43
[51] Int. Cl............................................. G01r 33/02, G01v 3/00
[50] Field of Search................................... 324/52, 67, 3; 336/117

[56] References Cited
UNITED STATES PATENTS

| | | | |
|---|---|---|---|
| 1,297,929 | 3/1919 | Taylor........................... | 324/67 X |
| 1,464,119 | 8/1923 | Stoller et al.................... | 324/52 |
| 1,696,230 | 12/1928 | Gilbert........................... | 324/67 X |
| 2,274,015 | 2/1942 | Tyrner........................... | 336/117 |
| 2,338,245 | 1/1944 | Hays et al. ..................... | 324/52 |
| 2,501,598 | 3/1950 | Eltenton et al. ............... | 324/67 |
| 2,983,865 | 5/1961 | Wenner......................... | 324/3 X |

OTHER REFERENCES

Young, C. A., Measuring the Depth of Buried Cable, Bell Laboratories Record Nov. 1965, pp. 399–401

Primary Examiner—Gerard R. Strecker
Attorney—Hopgood and Calimafde

ABSTRACT: A method and apparatus for locating a buried metallic line such as, for instance, a power line, telephone cable, water pipe, gas pipe, etc. without digging. An AC current is placed through the buried metallic line by direct connection or electromagnetic induction at a frequency of, for example, 100 kc., and the gradient of the magnetic field generated by the AC current is measured on a first and a second level above the ground surface. The lateral position on the ground surface where the metallic line is buried, is determined by the maximum reading of the magnetic field gradient when it is measured along the first level, while the depth of the buried metallic line may be obtained by comparing the magnetic field gradients measured on the first and second levels, respectively, at the detected position. The apparatus essentially comprises an AC signal generator to be connnected or coupled to the buried metallic line, at least one pair of differentially connected parallel coils, and means for measuring the voltage inducted in the coil pair. Since the field gradient is measured rather than the magnetic field, itself, any uniform magnetic field such as the field directly generated by the AC signal generator will not affect the positional information derived from the measurement, and thus the accuracy of the location of the buried metallic line is not adversely affected.

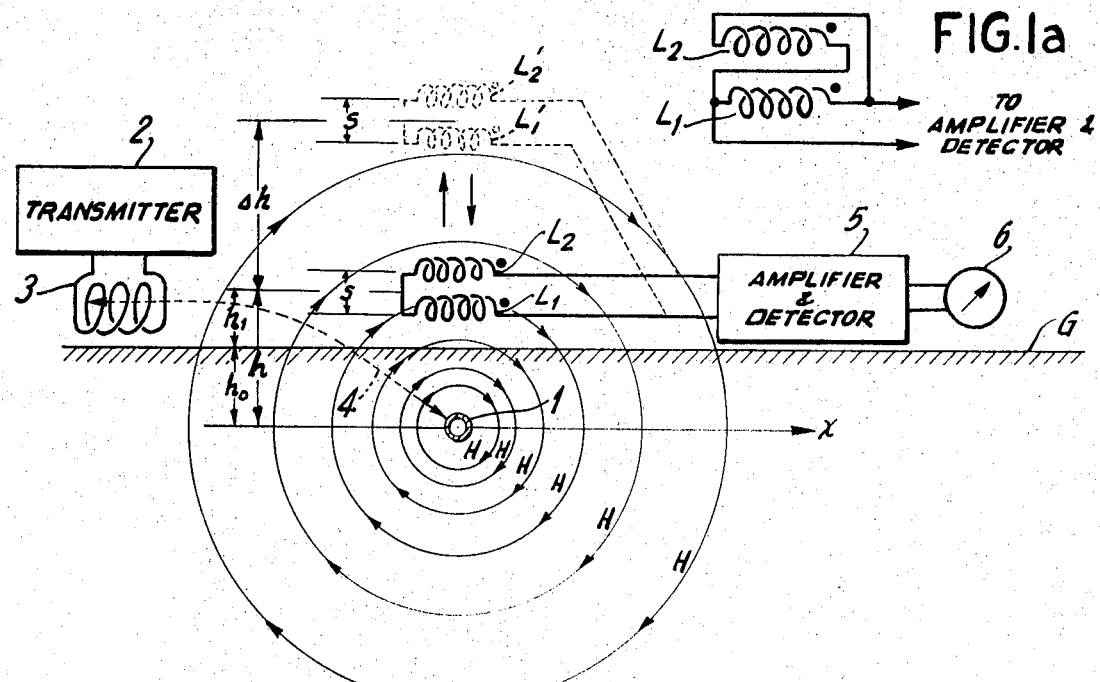
FIG. 1
FIG. 1a
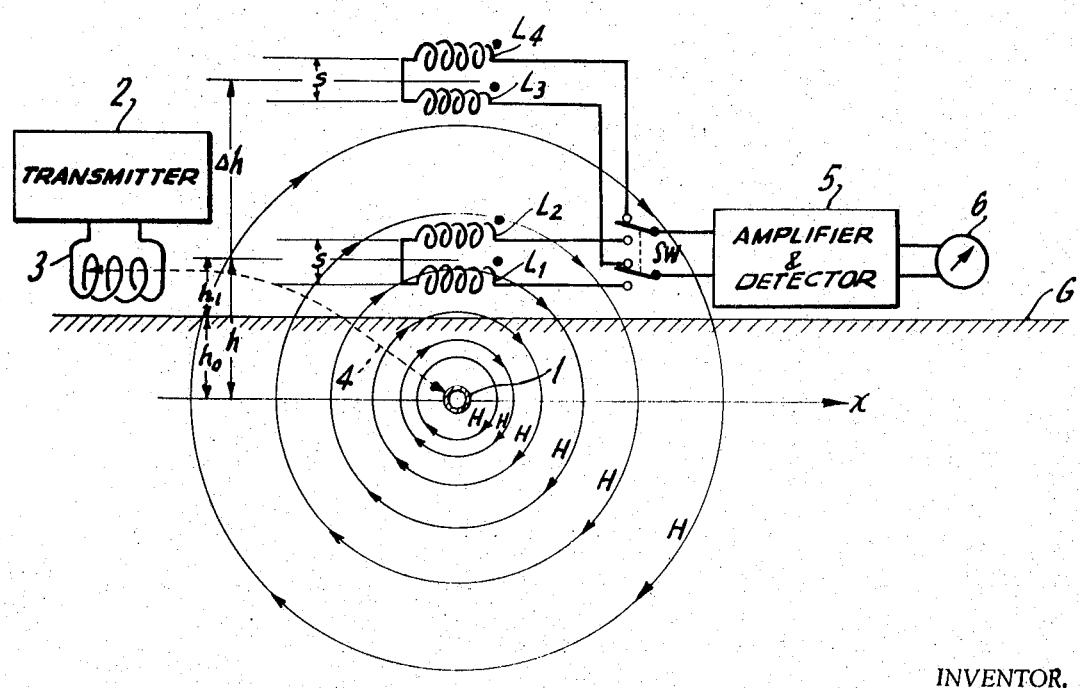
FIG. 2
INVENTOR.
GOROKU HAKATA

INVENTOR.
GOROKU HAKATA

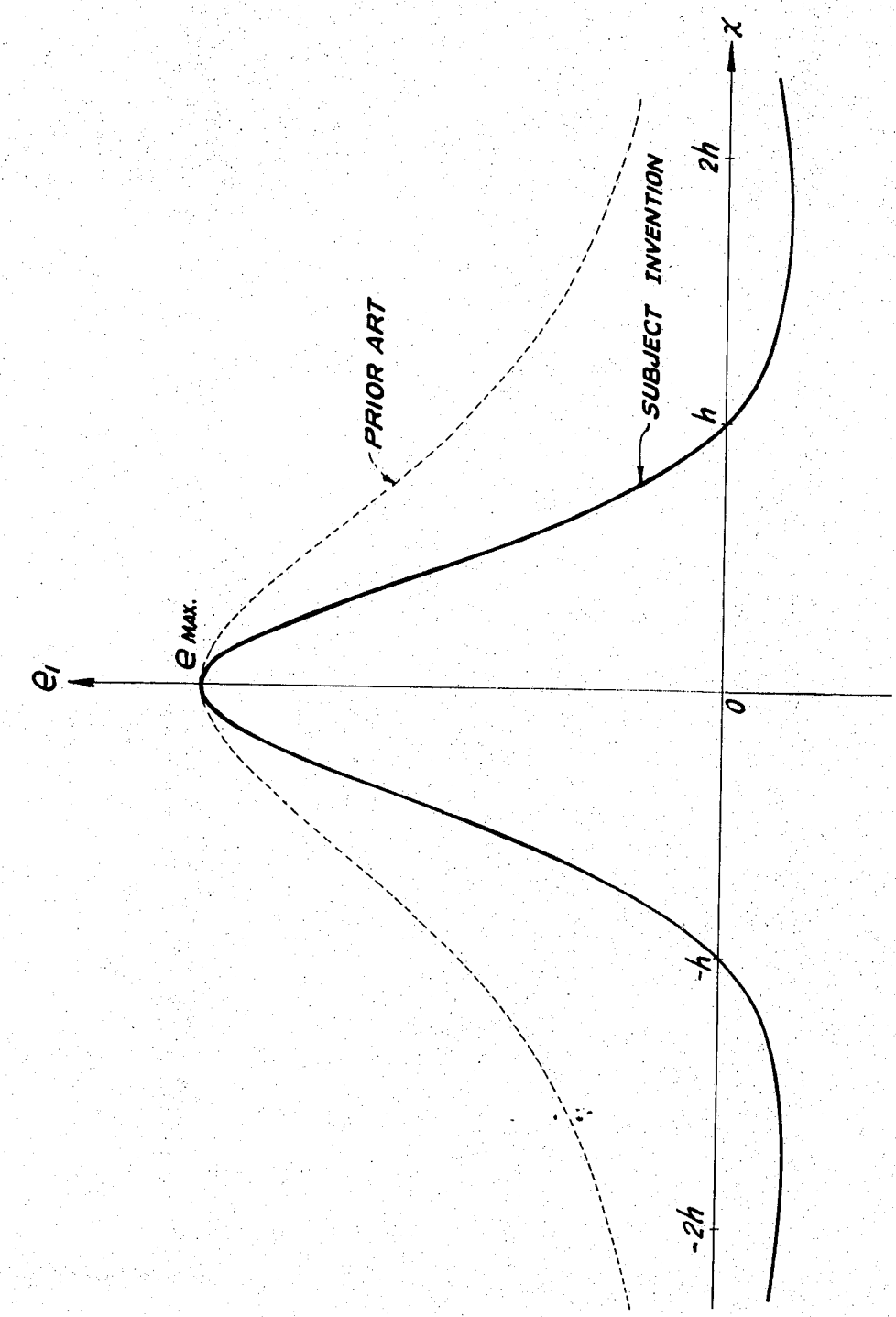

METHOD AND APPARATUS FOR LOCATING A BURIED METALLIC LINE EMPLOYING MAGNETIC FIELD GRADIENT MEASUREMENTS

BACKGROUND OF THE INVENTION

The present invention relates in general to a method and apparatus for locating a buried metallic line.

It has been the conventional practice to locate a metallic line such as, for example, a power line, telephone cable, water pipe, gas pipe, etc. buried under the ground by placing an AC current through the line and measuring the magnetic field generated by the current a predetermined level above the ground.

According to one prior art method, a magnetic search coil is moved transversely of the direction of the buried metallic line a predetermine level above the ground surface with its axis either vertical or horizontal and at a right angle to the direction of the buried metallic line. The AC voltage induced in the search coil by the circular magnetic field generated by the AC current is then measured. If the search coil is held vertically, the minimum reading of the induced voltage indicates that the metallic line is buried just beneath the point where the search coil is positioned. While if the search coil is held horizontally, the maximum reading of the induced voltage indicates that the metallic line is buried just beneath the point where the search coil is positioned.

In order to obtain the depth information, the search coil is again moved transversely of the direction of the buried metallic line a predetermined level above the ground surface and the induced AC current measured; but this time the axis is maintained in a plane perpendicular to the direction of the buried metallic line and at an angle such as 45° or 71.57° to the vertical. The depth of the buried metallic line with respect to the predetermined level is determined by a geometrical calculation based upon the distance between the point where the minimum reading of the induced AC voltage was obtained and the point on said predetermined level just above the buried metallic line.

An alternative method in the prior art for determining the depth of the buried metalic line is disclosed in an article by C. A. Young entitled, "Measuring the Depth of Buried Cable" appearing on pp. 339–401 of Bell Laboratories Record, Nov. 1965. According to this method, two vertically separated coils each held horizontally a predetermined level above the ground surface, are supported at a point just above the buried metallic line. At first an amplifier is switched to the bottom coil and the gain of the amplifier adjusted so that the voltage induced in the bottom coil corresponds to full scale deflection on a meter connected to the output. The amplifier is then switched to the top coil. Since the top coil is approximately three feet farther above the buried metallic line, a lesser deflection registers on the meter, which gives a measure of the depth of the buried line.

The aforementioned methods essentially utilize the magnetic field strength above ground, generated by an AC current placed through the buried metallic line, as the basis of determination of the lateral position and/or the depth of the buried metallic line. As a result, such methods have the inherent disadvantage that the measurement is strongly affected by magnetic fields other than the circular magnetic field purposely introduced around the buried metallic line. For instance, unless the amplifier for measuring the voltage induced in the search coil is provided with sharp frequency selective means tuned to the frequency of the AC current passing through the buried line, electric power lines passing nearby or car ignitions will induce a substantial voltage in the search coil. Even if the amplifier is sharply tuned, the magnetic field directly coupled from the source of the AC current, to the magnetic search coil, will disturb the output reading.

It is often required to locate each of two metallic lines buried laterally close to one another. In this case both lines must be distinguished with respect to their lateral position. In any one of the prior art methods, such a positional discrimination between adjacent lines was impossible, since the maximum peak of the induced voltage given by the single horizontal search coil in the prior art was too broad to afford sufficient resolution; and the sharp induced voltage minimums for a single metallic line in a vertical search coil degenerates into a broader single minimum valley when two metallic lines are buried close to one another.

OBJECT OF INVENTION

Therefore, one object of the present invention is to provide an improved method for locating a buried metallic line which is free from disturbances by other than purposely induced magnetic fields and is capable of discriminating the lateral positions of two adjacent metallic lines.

Another object of the present invention is to provide an improved apparatus for locating a buried metallic line which satisfies the foregoing object and which is simple, rugged and reliable.

BRIEF SUMMARY OF INVENTION

According to the present invention, the field gradient of the magnetic field generated by an AC current passed through the buried metallic line is measured rather than magnetic field strength a predetermined level above the ground by means of a pair of differentially connected parallel coils. In one preferred embodiment the coil pair consists of two vertically spaced and horizontally directed coils which when differentially connected, generate an induced AC voltage substantially proportional to the gradient in the vertical direction of the horizontal component of the magnetic field.

In another preferred embodiment the coil pair consists of two horizontally spaced and vertically directed coils, when differentially connected, generate an induced AC voltage substantially proportional to the gradient in the horizontal direction of the vertical component of the magnetic field.

Throughout this specification and the appended claims, the term "differentially connected" shall means that two coils or two coil pairs are connected to each other, either in series or in parallel, so that across the resultant output terminals of the coil assembly or coil pair assembly will appear the difference of the voltages respectively induced in the individual coils or coil pairs. In other words, when the two coils or coil pairs are connected in series, the terminals of the coils or coil pairs having the same polarity are joined together and the other terminals serve as output terminals of the assembly; and when the two coils or coil pairs are connected in parallel, the respective terminals of the coils or coil pairs having the opposite polarities are respectively joined, and the respective connections serve as output terminals of the assembly.

Upon determining the lateral position of the buried metallic line the differentially connected coils are moved at a predetermined first level transversely of the direction of the buried metallic line, while the induced AC voltage is measured. The maximum reading of the induced voltage indicates that the metallic line is buried just beneath the point where the coil pair is positioned at the time.

In order to determine the depth of the buried metallic line, the magnetic field gradients are measured at predetermined first and second levels at a point directly above the buried metallic line. The depth of the buried metallic line may then be obtained by a simple calculation from the measured values of the respective field gradients. Actually, an AC voltage induced in the differentially connected coils serves as a measure of the magnetic field gradient, and thus the depth of the buried metallic line is obtained by comparing the induced voltages measured on the first and second levels, respectively.

The above mentioned and other features and objects of this invention and the manner of attaining them will become more apparent and the invention itself will best be understood by reference to the following description of embodiments of the invention taken in conjunction with the accompanying drawings, the description of which follows.

BRIEF DESCRIPTION OF THE DRAWINGS

FIG. 1 is a diagrammatic view partially in block and partially in cross section showing the principle of the method of the present invention according to its first embodiment, coils in series;

FIG. 1a shows a pair of differentially connected parallel coils;

FIG. 2 is a diagrammatic view showing the principle of the method of the present invention according to a second embodiment;

FIG. 6 graphically depicts the voltage induced in the coil pair on a lower level in FIG. 1 versus the lateral distance between the coil pair and the buried metallic line (solid line), together with a similar plot (dotted line) obtained for a single horizontal search coil in the prior art;

DESCRIPTION OF THE PREFERRED EMBODIMENTS

Figure 3:
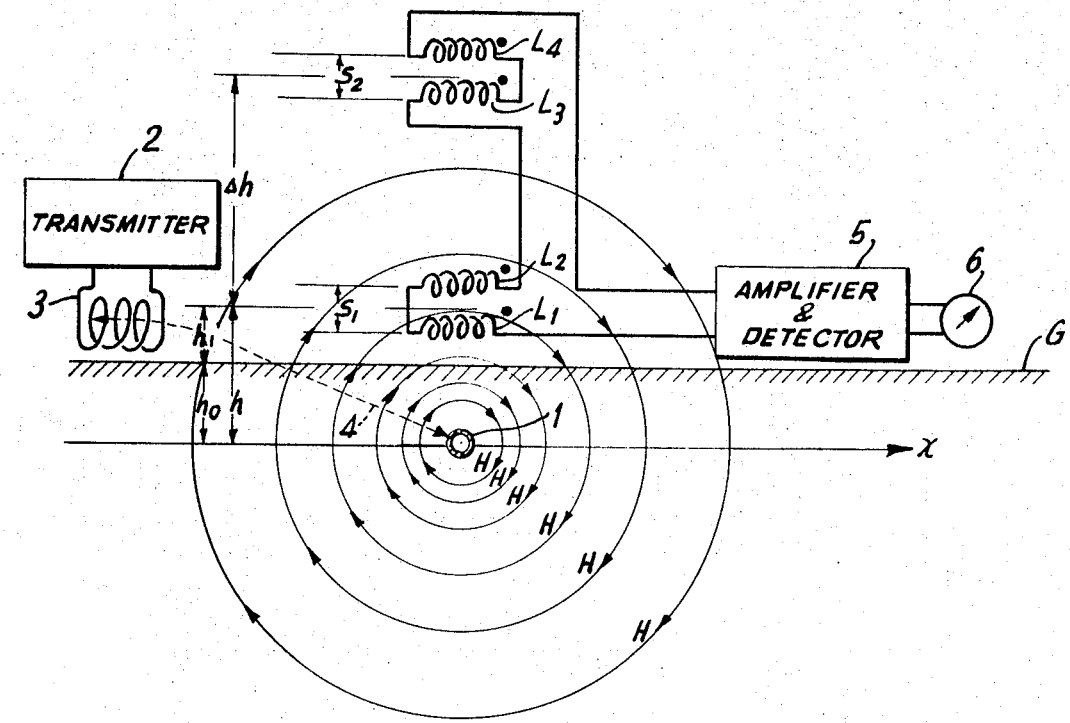
FIG. 3 is a diagrammatic view showing the principle of the method of the present invention according to a third embodiment.

Referring now to FIG. 1 of the drawings, the principle is diagrammatically shown. A metallic line 1 such as, for example, a power line, telephone cable, water pipe, gas pipe, etc. is shown in cross section as buried under the ground surface at a depth $h_o$. It is assumed that the metallic line 1 extends at a right angle to the plane of the drawing. In order to place an AC current through the buried metallic line, a transmitter 2 having its output connected to a transmitter coil 3 is disposed at a distance from the buried metallic line 1, so that AC signal supplied from the transmitter is electromagnetically coupled to the buried metallic line via the transmitter coil 3 as shown by an arrowed dashline 4. The transmitter 2 preferably supplies an AC signal having a frequency in the range of 20 to 200 kc., although it is not limited to such a frequency range. However, when the method is applied to a working telephone cable, it is necessary to select an AC signal frequency outside of the pass band of the telephone transmission in order to avoid disturbing telephone conversations. According to one preferred embodiment of the invention, an AC signal frequency of kc. 100 kc was employed with satisfactory results.

The electric current caused to flow through the metallic line 1 by electromagnetic coupling (or direct connection not sown) with the transmitter 2, generates at a particular moment in time an alternating circular magnetic field around the metallic line 1 as shown by thin arrowed lines H in FIG. 1. It is obvious from the general law of electromagnetism that the magnetic field strength H at a given point is inversely proportional to the distance between said point and the metallic line 1.

At first, a pair of coils $L_1$ and $L_2$ directed horizontally in the plane of the drawing and spaced vertically at a distance $s$, is disposed on a first level $h_1$ from the ground surface G. More particularly, the midpoint between the levels of the coils $L_1$ and $L_2$ is placed on a first level of $h_1$. As seen from the polarity indicating dots attached to the respective coils $L_1$, $L_2$, these two coils which have substantially the same dimensions and number of turns are serially and differentially connected, so that across the output terminals appears the difference of the induced voltages. These output terminals of the coil pair $L_1$-$L_2$ are coupled to the input of an amplifier and detector circuit 5, the output of which is connected to an output indicator 6.

Upon operation, an AC voltage is induced in each of the coils $L_1$ and $L_2$ by the AC current flowing through the buried metallic line 1. Since the coil $L_1$ is at a distance above the cable of $h$-$s/2$ where $h=h_1+h_0$ while the coil $L_2$ is at a distance of $h+s/2$, different voltages are induced in the respective coils $L_1$ and $L_2$. The difference of the induced AC voltages is amplified and detected by the amplifier and detector 5, and the resultant DC output is indicated on he output indicator 6. The coil pair $L_1$-$L_2$ is moved horizontally along the level $h$ above the buried metallic line 1 transversely of the direction of the line while observing the output indicator 6.

When the coil pair $L_1$-$L_2$ is positioned at a lateral distance $x$ from the metallic line 1, the output voltage $e_1$ of the coil pair $L_1$-$L_2$ has the following value:

$$e_1 = ki \left[ \frac{h-\frac{s}{2}}{\left(h-\frac{s}{2}\right)^2 + x^2} - \frac{h+\frac{s}{2}}{\left(h+\frac{s}{2}\right)^2 + x^2} \right]$$

$$= ki \frac{s}{h^2} \cdot \frac{1 - \frac{1}{4}\left(\frac{s}{h}\right)^2 - \left(\frac{x}{h}\right)^2}{\left[1 - \frac{1}{4}\left(\frac{s}{h}\right)^2\right]^2 + \frac{x^2}{h^2}\left[\left(\frac{x}{h}\right)^2 + \frac{1}{2}\left(\frac{s}{h}\right)^2 + 2\right]} \quad (1)$$

where $k$ is a constant determined by the design of the respective coils $L_1$ and $L_2$, and $e_1$ and represent the effective values of the AC voltage induced across the coil pair $L_1$-$L_2$ and the AC current placed through the buried metallic line 1. For given values of $i$ and $s$, the relation between the induced voltage $e_1$ and the lateral distance $x$ is plotted in FIG. 6. As will be seen from Equation (1) above and FIG. 6, the voltage $e_1$ shows a sharp maximum peak at $x=0$, that is, at the point right above the buried metallic line 1. Therefore, by detecting the position where the maximum output is obtained on the indicator 6, the lateral position of the buried metallic line may be easily determined.

Here it is to be noted that in contrast to the plot to the voltage induced in a single horizontal coil such as $L_1$ versus the lateral distance $x$ which was used in the prior art method, the plot of the difference voltage $e_1$ shown in FIG. 6 has a relatively sharp peak at $x=0$. Consequently, the method of the present invention has the advantage that lateral position may be determined more accurately than in the method of the prior art, in addition to the principal advantage that a disturbing magnetic field of a uniform nature would not affect measured positional data of the buried metallic line 1. Therefore, the method of the present invention enables the discrimination of lateral positions of two adjacent metallic lines buried close to each other.

In the next step for determining the depth of the metallic line from the ground surface G, the lateral position of the coil pair $L_1$-$L_2$ are fixed at $x=0$, that is, at the position right above the buried metallic line 1, and the difference of the induced voltages $e_{10}$ at this lateral position is obtained from the reading of the preliminarily calibrated output indicator 6. Then the coil pair $L_1$-$L_2$ is raised vertically by $\Delta h$ to the second level indicated by a dotted line as $L'_1$-$L'_2$, with the connection to the amplifier and detector 5 retained. The difference of the induced voltages $e_{20}$ at this position is measured by the output indicator 6. From equation (1) above, the differential voltages $e_{10}$ and $e_{20}$ are derived as follows:

$$e_{10} = ki \frac{s}{h^2} \cdot \frac{1}{1-\frac{1}{4}\left(\frac{s}{h}\right)^2} = \frac{kis}{h^2 - \frac{s^2}{4}} \quad (2)$$

$$e_{20} = \frac{kis}{(h+\Delta h)^2 - \frac{s^2}{4}} \quad (3)$$

$$\text{Accordingly, } \frac{e_{20}}{e_{10}} = \frac{h^2 - \frac{s^2}{4}}{(h+\Delta h)^2 - \frac{s^2}{4}} \quad (4)$$

When a square-law detector is employed in the amplifier and detector 5, the reading of the output indicator 6 gives a deflection proportional to either $(e_{10})^2$ or $e_{20}$. Therefore, if the gain of the amplifier and detector 5 is adjusted so that $(e_{10})^2$ is indicated at a fixed point on the indicator 6, then the reading of the indicator 6 for $(e_{20})^2$ can give the measure of $M=(e_{20}/e_{10})^2$. For a representative value of $\Delta h=0.3$ m. the relation between the depth $h$ (from the first level $h_1$) and $h_0$ and the ratio $M$ may be calculated as follows:

| $h_o$ (m) | $h$ (m) | $M$ |
|---|---|---|
| 0 | 0.3 | 0.04 |
| 0.3 | 0.6 | 0.184 |
| 0.6 | 0.9 | 0.309 |
| 0.9 | 1.2 | 0.404 |
| 1.2 | 1.5 | 0.480 |
| 1.5 | 1.8 | 0.538 |
| 1.8 | 2.1 | 0.582 |
| 2.1 | 2.4 | 0.623 |

Thus it will be seen that the output indicator can be indexed with the direct reading of the depth $h$ from the first level or the depth $h_0$ from the ground surface for the measurement of $e_{20}$. In this case, it is to be noted that for measurement of $e_{10}$, the gain of the amplifier and detector 5 must be adjusted so as to give an indication corresponding to $M=1$.

However, it should be understood that the present invention is not limited to the direct reading of the depth of the buried metallic line 1, because if desired, one can determined the depth of the buried metallic line from the measured values of $e_{10}$ and $e_{20}$.

In the above-described first embodiment of the invention and the subsequent modified embodiments, for the sake of simplicity, the two coils or two coil pairs which are to be differentially connected are illustrated as being connected in series. However, as pointed out before, the coil pairs may be differentially connected in parallel. In FIG. 1a it will be easily seen by those skilled in the art that if the respective coils have the winding polarity as indicated by the polarity dots, a difference of the voltages induced in the respective coils $L_1$ and $L_2$ will appear across the output terminals. The difference between the series connection as shown in FIGS. 1 to 5 and the parallel connection as shown in FIG. 1a is that assuming the respective coils have the same inductance, the parallel connection shows an output impedance of one-half the impedance of the single coil, while the series connection shows an output impedance of double the impedance of the single coil. Therefore, practically, the parallel connection is preferable for minimizing the capacitive coupling of the AC signal between the buried metallic line and the search coils.

In FIGS. 2 to 5 of the drawings, there is shown various alternative examples for embodying the basic invention concept of the present invention. Various components which are similar to those represented in FIG. 1 are given the same reference numerals, and described below is only the difference between these alternative embodiments and the embodiment in FIG. 1.

The embodiment shown in FIG. 2 is substantially similar to that shown in FIG. 1 except for the point that two separate pairs $L_1$-$L_2$ and $L_3$-$L_4$ of serially and differentially connected parallel coils are disposed on a first level (h) above the buried metallic line 1 and on a second level $h+\Delta h$) above the buried line, respectively, and the input terminals of the amplifier and detector 5 are selectively connected through a double contact transfer switch SW to the output terminals of either one of the coil pairs $L_1$-$L_2$ and $L_3$-$L_4$. The operation of the system is almost similar to that explained with reference to FIG. 1, except for the fact that in this example instead of moving the single coil pair vertically between its bottom and top positions, the operation of the transfer switch SW can easily afford the measure of the magnetic field gradients on the first and second levels, respectively.

Therefore, the embodiment in FIG. 2 has an advantage over the embodiment in FIG. 1 in that the measuring apparatus is relatively simple in structure. However, the embodiment of FIG. 1 has an advantage that since the same coil pair is used on the first and second levels, a measurement error due to the slight difference in the coil design between the upper and lower coil pairs would not be introduced. This merit is especially important when the search coils $L_1$ and $L_2$ are operated in a tuned LC circuit.

The third embodiment of the invention shown in FIG. 3 of the drawing is similar to the embodiment in FIG. 2 in that two separate coil pairs $L_1$-$L_2$ and $L_3$-$L_4$ are employed but different from the latter in that the two coil pairs are serially and differentially connected between the input terminals of the amplifier and detector 5 rather than separately and selectively connected between the input terminals of the amplifier and detector 5. In this case, the coil pair $L_3$-$L_4$ is designed to have different coil parameters from those of the coil pair $L_1$-$L_2$ so that the differential induced voltage in the coil pair $L_3$-$L_4$ may be substantially equal to the differential induced voltage in the coil pair $L_1$-$L_2$. For instance, if the design of the four component coils, $L_1$, $L_2$, $L_3$, and $L_4$ are the same, the separation $s_2$ between the coils $L_3$ and $L_4$ is chosen larger than the separation $s_1$ between the coils $L_1$ and $L_2$.

Of course, in the embodiment in FIG. 3 when the lateral position of the buried metallic line 1 is being located, only the coil pair $L_1L_2$ is connected to the input terminals of the amplifier and detector 5 through a circuit not shown, and the same measurement of the magnetic field gradient along the first level $h$ as described with reference to FIG. 1 is carried out.

In order to determine the depth of the buried metallic line 1, the distance $\Delta h$ between the two coil pairs and/or the separation $s_2$ in the upper coil pair is varied until the output indicator 6 gives a null output. Then, obviously the difference of the induced voltages in the lower coil pair $L_1L_2$ is exactly the same as the difference of the induced voltage in the upper coil pair $L_3L_4$. Assuming that each component coil has the same design, the ratio of the magnetic field gradients on the first and second levels is determined from the ratio of the coil separations $s_1/s_2$.

The additional advantage of the embodiment in FIG. 3 over the preceding embodiments is that due to the null method employed in this example, the voltage induced in the respective component coils by any disturbing magnetic field may be offset more completely.

In the embodiment shown in FIG. 3, in order to obtain the difference of the induced voltages between the respective coil pairs, the coil pairs are connected in series. However, it will be easily understood by those skilled in the art that the upper and lower coil pairs could be connected in parallel so that the same opposite polarity terminals thereof are jointed together, respectively. Then the respective connections serve as the output terminals of the coil pair assembly.

Figure 4:
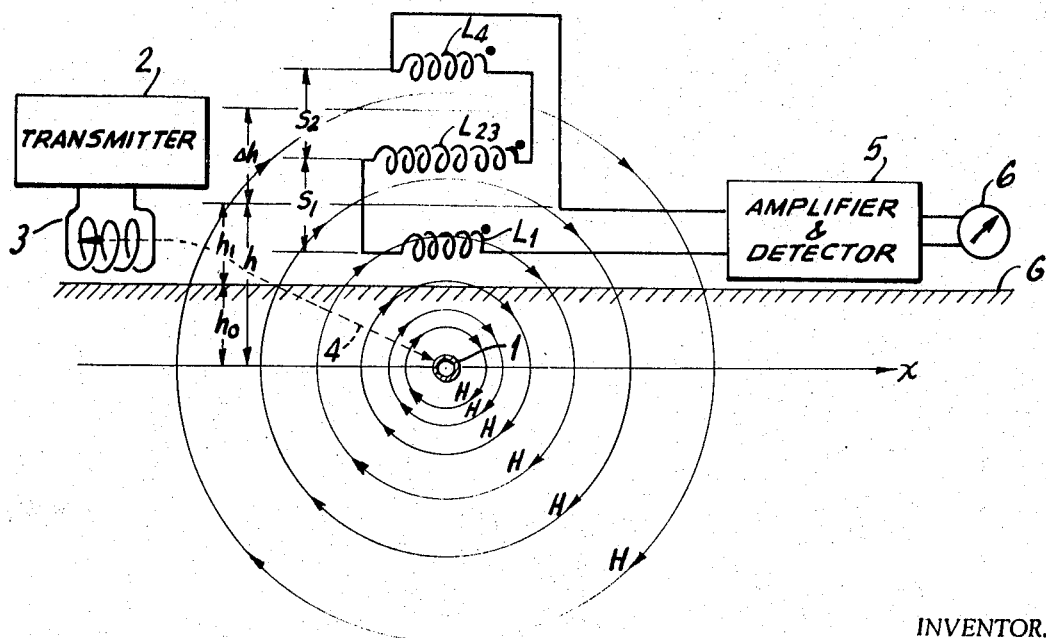
FIG. 4 is a diagrammatic view showing the principle of the method of the present invention according to a modification of the embodiment in FIG. 3.

The embodiment of FIG. 4 is a modification of the embodiment of FIG. 3 in that the component coils $L_2$ and $L_3$ in FIG. 3 are constructed as a single integral coil $L_{23}$ disposed between the coils $L_1$ and $L_4$ in FIG. 4. It will be easily understood that if $s_1$, $s_2$, and $\Delta h$ in FIG. 3 are selected to satisfy the condition of $\Delta h=1/2(s_1+s_2)$, then the component coils $L_2$ and $L_3$ will be on the same level and consequently they may be formed integrally as shown in FIG. 4. Therefore, the operation of the embodiment in FIG. 4 is exactly similar to that described with reference to FIG. 3. This embodiment has an advantage over the embodiment in FIG. 3 in that the construction is simplified.

Figure 5:
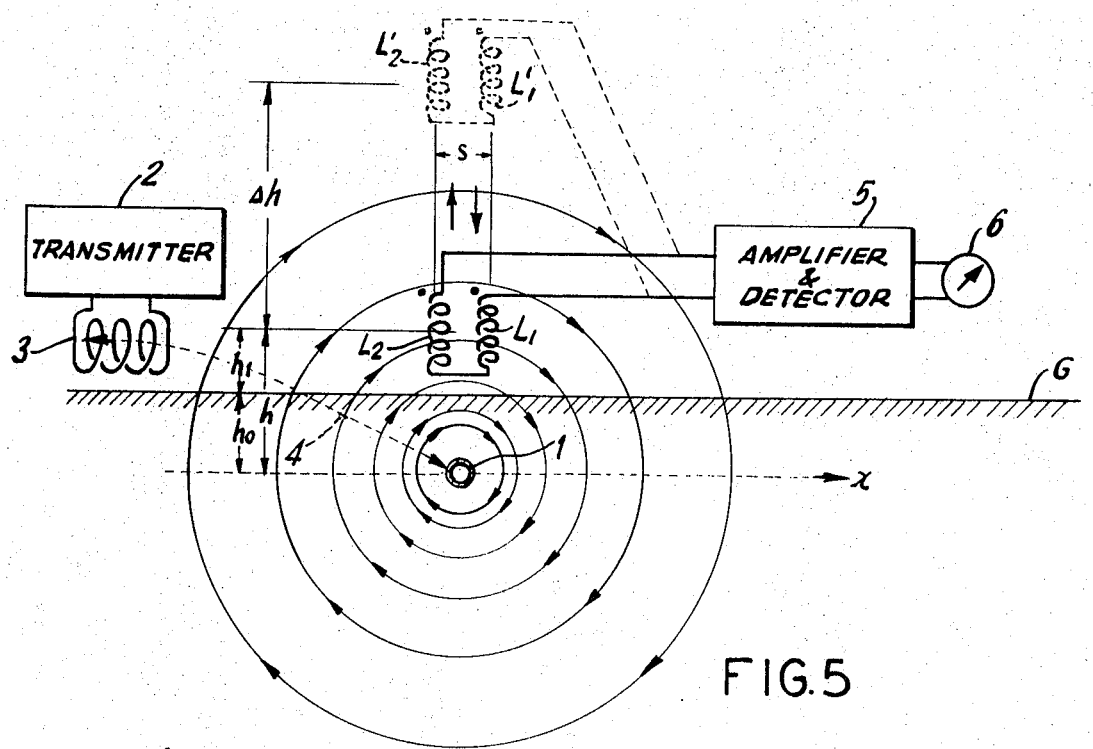
FIG. 5 is a diagrammatic view showing the principle of the method of the present invention according to a modification of the embodiment in FIG. 1.

The embodiment shown in FIG. 5 is a modification of the embodiment in FIG. 3 in that the movable coil pair $L_1L_2$ consists of two vertically directed and horizontally spaced parallel coils rather than two horizontally directed and vertically spaced parallel coils as described with reference to the preceding embodiments. It is to be noted that although only a modification of this type to the embodiment in FIG. 1 is exemplified, the similar type of modification is equally possible to the embodiments shown in FIGS. 2 and 3.

Here it should be recalled that the differential induced voltage obtained from the differentially connected coil pair which consists of two horizontally directed and vertically spaced parallel coils, can serve as a measure of the field gradient in the vertical direction of the horizontal component of the magnetic field. Now the differentially induced voltage obtained from the modified coil pair consisting of two vertically directed and horizontally spaced coils as shown in FIG. 5 can serve as a measure of the field gradient in the horizontal direction of the vertical component of the magnetic field. Mathematical relations similar to those represented by equations (1) to (4) are derived as follows:

$$e_1 = ki\left[\frac{x-\frac{s}{2}}{h^2+\left(x-\frac{s}{2}\right)^2} - \frac{x+\frac{s}{2}}{h^2+\left(x+\frac{s}{2}\right)^2}\right]$$

$$= ki\frac{s}{h^2}\frac{1+\frac{1}{4}\left(\frac{s}{h}\right)^2-\left(\frac{x}{h}\right)^2}{\left[1+\frac{1}{4}\left(\frac{s}{h}\right)^2\right]+\frac{x^2}{h^2}\left[\left(\frac{x}{h}\right)^2-\frac{1}{2}\left(\frac{s}{h}\right)^2+2\right]} \quad (1')$$

$$e_{10} = ki\frac{s}{h^2}\frac{1}{1+\frac{1}{4}\left(\frac{s}{h}\right)^2} = \frac{kis}{h^2+\frac{s^2}{4}} \quad (2')$$

$$e_{20} = \frac{kis}{(h+\Delta h)^2+\frac{s^2}{4}} \quad (3')$$

$$\frac{e_{20}}{e_{10}} = \frac{h^2+\frac{s^2}{4}}{(h+\Delta h)^2+\frac{s^2}{4}} \quad (4')$$

Thus it can be seen that the modified embodiment in FIG. 5 operates substantially in the same manner as the first embodiment shown in FIG. 1.

The relation between $e_1$ and $x$ according to equation (1) or (1') is plotted by a solid line in FIG. 6 assuming $1/4(s/h)^2 \leq 1$. Precisely, the curves for equation (1) and equation (1') are slightly different. However, it is to be noted when the ratio $1/4(s/h)^2$ is less than unity, the two curves substantially coincide with each other.

On the other hand, when a single horizontal coil is used to obtain the maximum induced voltage along the same level $h$ according to the prior art method, the induced voltage $e_1'$ is related to the lateral position $x$ as follows:

$$e_1' = ki(/h^2+x^2)$$
$$= e'\text{max.}(h^2/h^2+x^2)$$

Therefore, the relation between $e_1'$ and $x$ has a broader peak at $x=0$ as shown by a dotted line curve in FIG. 6. This proves that the method of the present invention enables the determination of the lateral position of the buried metallic line more accurately than the prior art method, and permits the discrimination between the lateral positions of two adjacent metallic lines buried close to each other.

Figures 7, 8, 9:
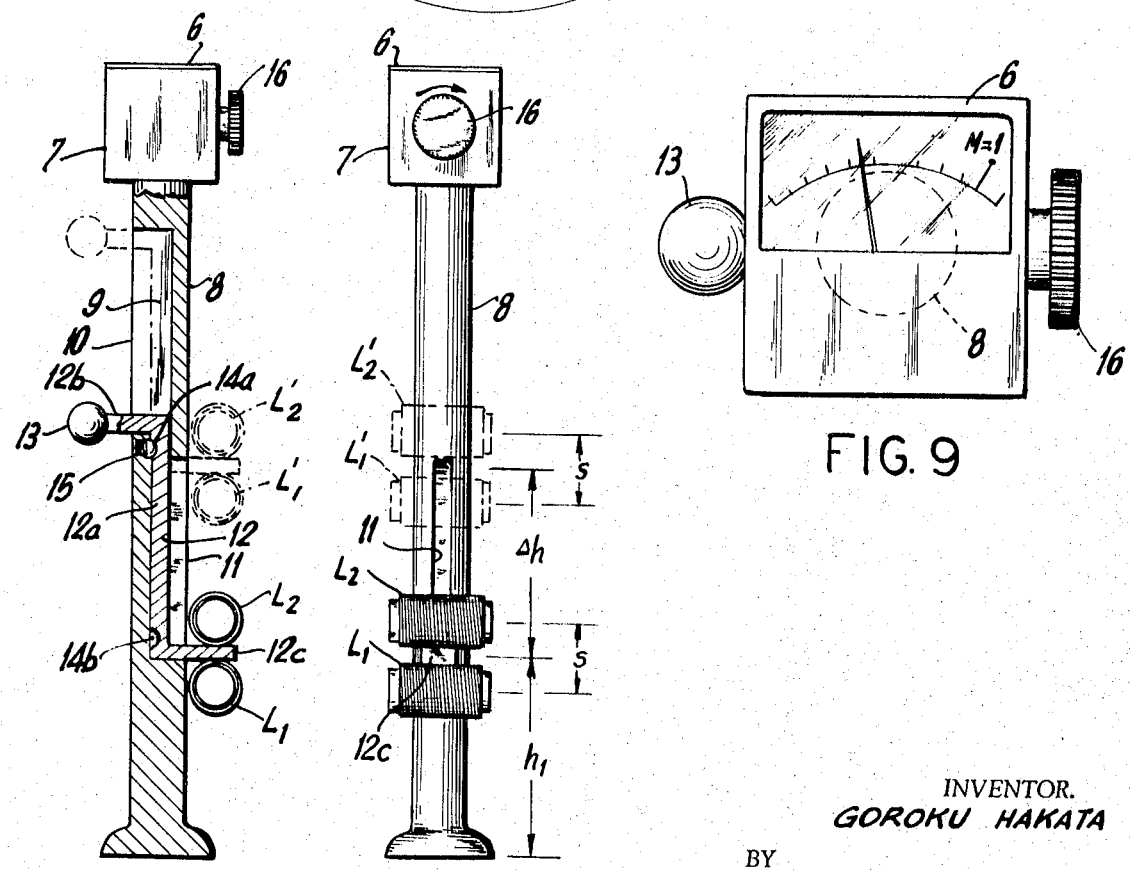
FIG. 7 is a partial longitudinal cross section view of the novel apparatus according to the first embodiment of the present invention.
FIG. 8 is a side elevational view of the apparatus as viewed from the right side in FIG. 7.
FIG. 9 is a top plan view of the apparatus shown in FIGS. 7 and 8.

Now referring to FIGS. 7 to 9 of the drawings, one preferred embodiment of the apparatus according to the present invention illustrated. Although this apparatus is constructed according to the system described with reference to Fig. 1, it will be easily understood by those skilled in the art that the apparatus may be modified so as to carry out the methods described with reference to FIGS. 2 to 5, respectively.

In these figures, an instrument box 7 containing the amplifier and detector circuit 5 therein and provided with the output indicator 6 on its top, is mounted on the top of a cylindrical support 8 made of nonmagnetic substance, which is adapted to stand vertically on a ground surface. As is shown in cross section in FIG. 7, along the central axis of the cylindrical support 8 is provided a cylindrical bore 9 having a smaller diameter. On the diametrically opposed sides of the cylindrical support, elongated vertical slots 10 and 11 are provided so as to communicate with the upper and lower parts, respectively, of the central bore 9. In the central bore 9 and the slots 10 and 11 is slidably fitted a Z-shaped coil support member 12 consisting of a cylindrical center portion 12a, an upper horizontal projection 12b an a lower horizontal projection 12c. The vertical slots 10 and 11 have the same width as those of the projections 12b and 12c, so that they serve as guide ways for these projections for enabling the vertical displacement of the Z-shaped coil support member 12 between its upper and lower limits without causing its rotational displacement. At the end of the upper projection 12b, a spherical knob 13 is fixedly secured to facilitate the manual actuation of the coil support member 12. On one side of the cylindrical center portion 12a are provided substantially semicircular indentations 14a and 14b adjacent to its upper and lower ends, respectively, which are adapted to mate with a resilient protrusion 15 provided on the inner wall of the cylindrical bore 9 and consisting of a ball and a spring inserted in a recess on the inner wall. When the coil support member 12 is at its lowermost position as shown by a solid line in FIG. 7, the resilient protrusion 15 mates with the indentation 14a, whereas when the coil support member 12 is at its uppermost position as shown by a dotted line in FIG. 7, the resilient protrusion 15a mates with the other indentation 14b. Thus it will be apparent that the resilient protrusion 15 and indentations 14a and 14b serve as means for holding the coil support member 12 at its upper and lower positions respectively.

The component coils $L_1$ and $L_2$ in the coil pair as shown in FIG. 1 are fixedly secured to the upper and lower sides of the lower projection 12c of the coil support member 12 by any suitable means. Therefore, when the coil support member 12 is raised to its upper position as shown by a dotted line, the coil pair $L_1$-$L_2$ is also moved vertically to the position $L_1'$ and $L_2'$ represented by a dotted line. As shown in FIG. 8, if the separation between the axes of the two coils $L_1$ and $L_2$, and the heights of the lower projection 12c from the ground surface at its upper and lower positions are selected to be equal to $s$, $h_1$ and $h_1 = \Delta h$ as indicated in FIG. 1, then it is obvious the apparatus in FIGS. 7 and 8 can operate according to the principle described with reference to FIG. 1.

In one preferred embodiment, each coil $L_1$ or $L_2$ comprises a coil of 50 turns wound around a ferrite core of 9 mm. in diameter and 10 cm. in length. The separation $s$ between the coils was selected equal to 30 cm., and the increment $\Delta h$ of the height was selected also equal to 30 cm. The same apparatus affords a satisfactory depth measurement accuracy of ±5 percent in the region of less than 2 m. depth.

As shown in FIG. 9, on the top of the instrument box 7 is provided an output indicator 6 normally consisting of a common DC voltmeter. From one side of the instrument box 7 projects a gain control knob 16, which serves to adjust the gain of the amplifier and detector 5 so that the output meter 6 indicates a predetermined point on the scale as indicated by $M=1$ when the apparatus is just above the buried metallic line 1 with the coil pair $11-L_2$ held on the lower level.

After the gain adjustment has been completed by means of the control knob 16 and the output meter 6, the operator grasps the knob 13 and manually raises the coil support member 12 together with the coil pair $L_1-L_2$ until the coil pair comes to its upper position $L_1'-L_2'$ as shown by a dotted line. Then the differential voltage induced in the coil pair $L_1'-L_2'$ is reduced, and the output meter registers a reading less than $M=1$, as shown in the above-indicated table between the numerical values of $h_0$, $h$ and $M$. Therefore, it is possible to index the output meter 6 by the direct reading of $h_0$ or $h$ instead of the reading of $M$.

Since many changes could be made in the above construction and widely different embodiments of this invention could be made without departing from the scope thereof, it is intended that all matter contained in the above description or shown in the accompanying drawings shall be interpreted as illustrative and not in a limiting sense.

What is claimed is:

1. A method for locating a buried metallic line, comprising the steps of: inductively coupling an AC current to said line for generating a magnetic field about said line; measuring the analog field gradient amplitude of the magnetic field generated by said AC current on a first level above the ground surface in a plane transverse to said line, including measuring the field gradient in a direction transverse to the line for detecting a position along said first level where a maximum value of said measured magnetic field gradient is obtained for laterally locating said line; measuring the analog field gradient amplitude of the magnetic field generated by the AC current at said detected position on a second level above the ground surface; and comparing the measured magnetic field gradient amplitudes on said first and second levels at said detected position with each other to obtain a measure of the depth of the buried metallic line under the ground surface.

2. The method of claim 1, wherein the steps of measuring the magnetic field gradient on said first and second levels, respectively, include measuring the AC voltage induced in a pair of differentially connected parallel coils spaced at a distance along the direction of the desired gradient and having their axes directed in the direction of the field component whose gradient is to be measured.

3. The method of claim 2, wherein the step of measuring the magnetic field gradient on said second level includes the step of displacing the pair of differentially connected parallel coils from said first level to said second level at said detected position.

4. The method of claim 2, wherein the step of measuring the magnetic field gradient on said second level includes the steps of disconnecting the pair of differentially connected parallel coils disposed on said first level from means for measuring the AC voltage induced across said parallel coil pair, and connecting said AC voltage measurement means to another pair of differentially connected parallel coils disposed on said second level.

5. The method of claim 2, wherein the steps of measuring the magnetic field gradient at the second level and comparing the magnetic field gradients on said first and second levels with each other jointly include differentially connecting the pair of differentially connected parallel coils disposed on said first level with another pair of differentially connected parallel coils disposed on said second level, and varying the mutual positional relation of the component coils of said two pairs of coils so as to obtain a null output the differentially the differentially connected coil pairs.

6. Apparatus for locating a buried metallic line comprising means for inductively coupling an AC current to said line for generating a magnetic field about said line, means for measuring the analog field gradient amplitude of the magnetic field generated by said AC current on a first level about the ground surface in a plane transverse to said line including means for measuring the field gradient in a direction transverse to the line by detecting a position along said first level where a maximum value of said measured magnetic field gradient is obtained for laterally locating said line, means for measuring the analog field gradient amplitude of the magnetic field generated by the AC current at said detected position on a second level above the ground surface, and means for comparing the measured magnetic field gradient amplitudes on said first and second levels at said detected position with each other for obtaining a measure of the depth of the buried metallic line under the ground surface.

7. Apparatus as in claim 6, wherein said first level and said second level analog field gradient amplitude measuring means comprises first and second differentially connected spaced parallel coils.

* * * * *